No. 882,446. PATENTED MAR. 17, 1908.
F. X. BIMMERLE.
ADVERTISING VEHICLE.
APPLICATION FILED APR. 7, 1905.
7 SHEETS—SHEET 1.
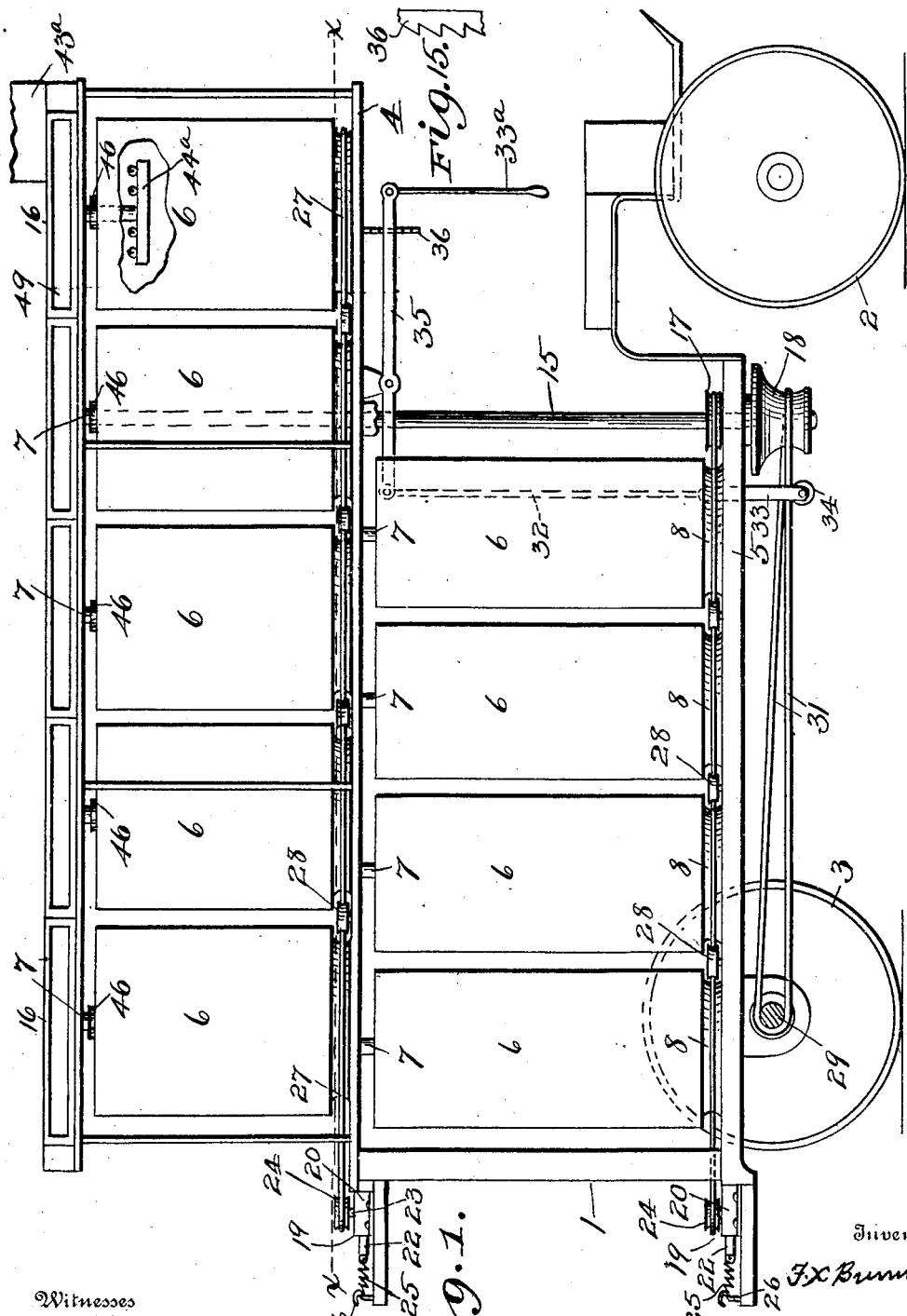

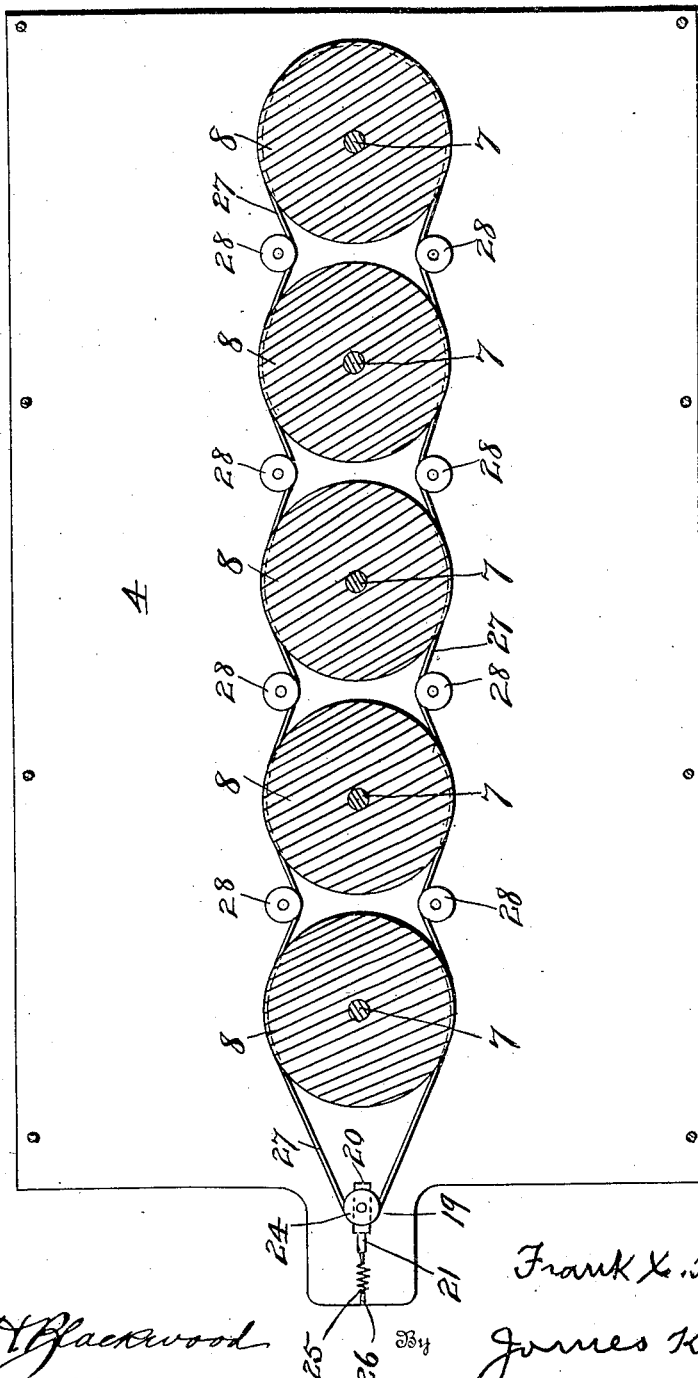

No. 882,446. PATENTED MAR. 17, 1908.
F. X. BIMMERLE.
ADVERTISING VEHICLE.
APPLICATION FILED APR. 7, 1905.
7 SHEETS—SHEET 3.
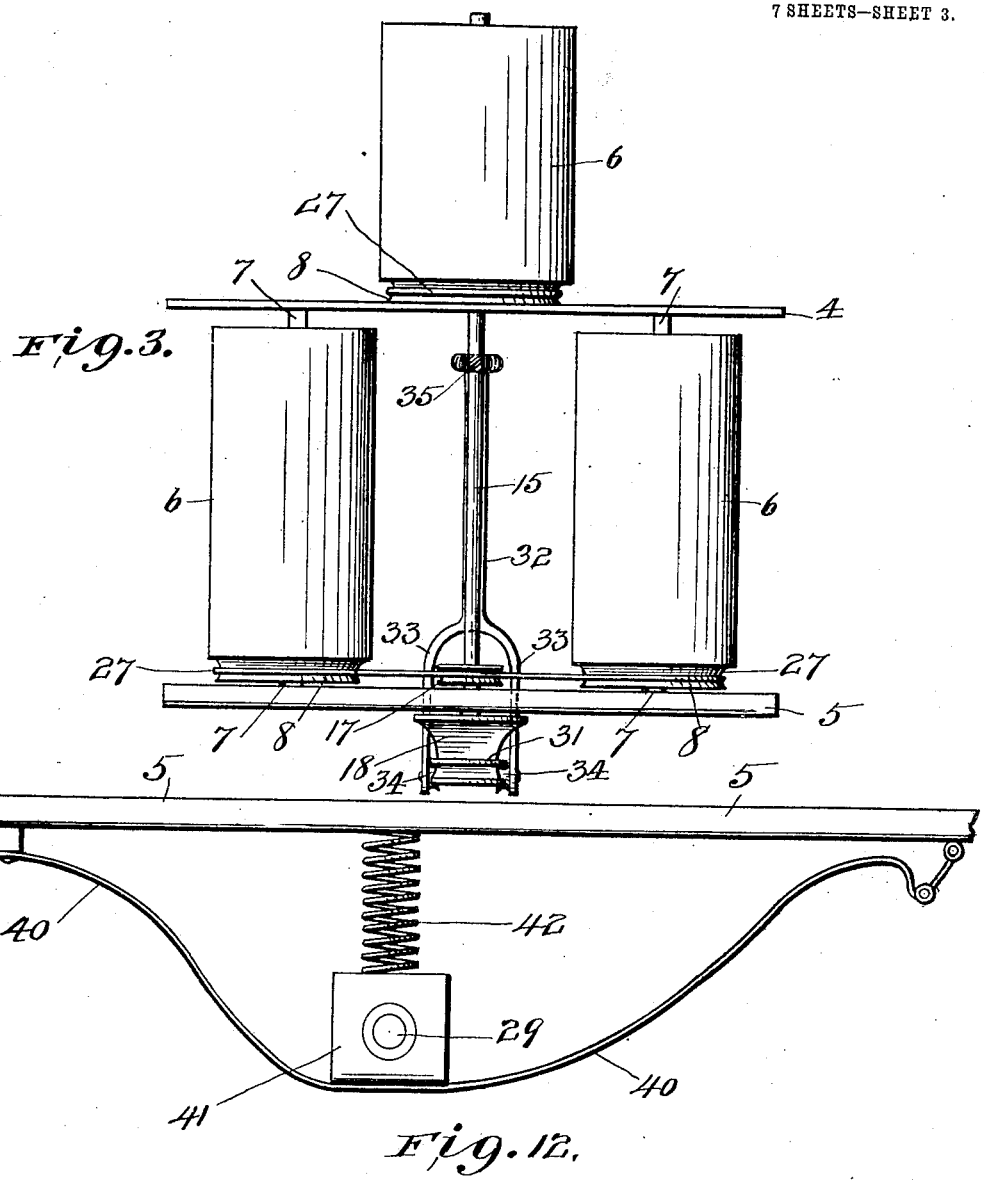
Witnesses
Jas. H. Blackwood
Jennie D. Gregory
Inventor
Frank X. Bimmerle
By James K. Polk
Attorney No. 882,446. PATENTED MAR. 17, 1908.
F. X. BIMMERLE.
ADVERTISING VEHICLE.
APPLICATION FILED APR. 7, 1905.
7 SHEETS—SHEET 4.
*Fig. 4.*
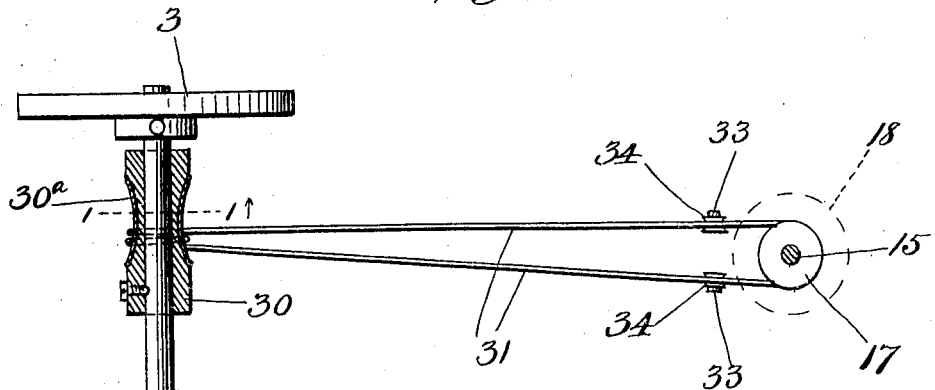
*Fig. 4ª*
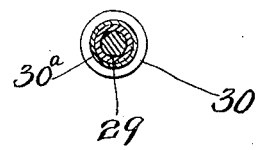
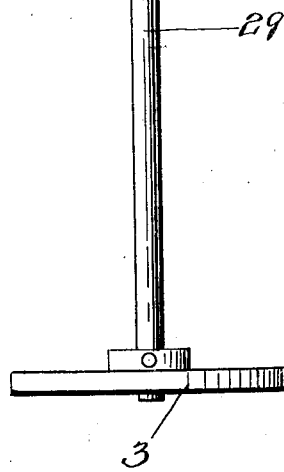
*Fig. 5.*
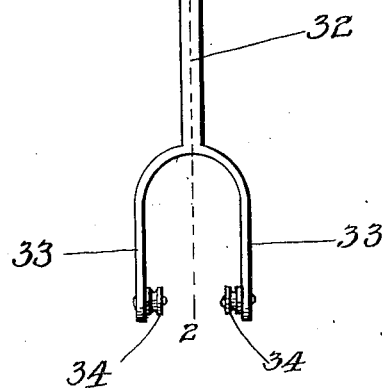
Witnesses
Jas. H. Blackwood
Jennie D. Gregory
Inventor
Frank X. Bimmerle
By James K. Polk
Attorney
THE NORRIS PETERS CO., WASHINGTON, D. C.

No. 882,446. PATENTED MAR. 17, 1908.
F. X. BIMMERLE.
ADVERTISING VEHICLE.
APPLICATION FILED APR. 7, 1905.

7 SHEETS—SHEET 5.

Witnesses
Jas. H. Blackwood
Jennie D. Gregory

Inventor
Frank X. Bimmerle
By James K. Polk
Attorney

No. 882,446. PATENTED MAR. 17, 1908.
F. X. BIMMERLE.
ADVERTISING VEHICLE.
APPLICATION FILED APR. 7, 1905.
7 SHEETS—SHEET 6.
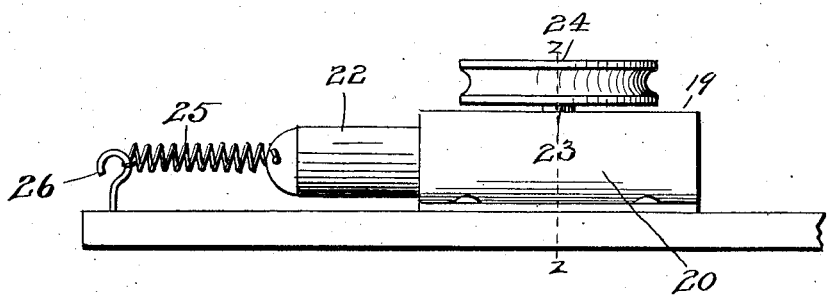
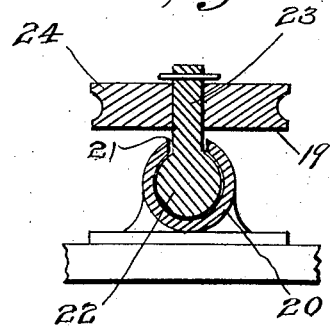
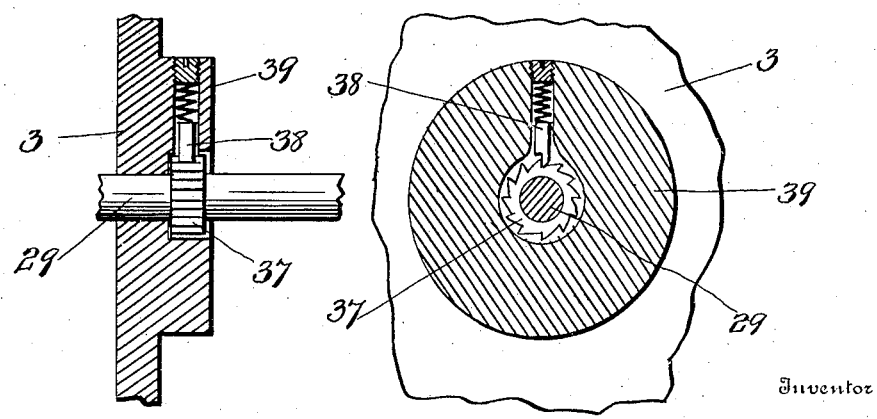

No. 882,446. PATENTED MAR. 17, 1908.
F. X. BIMMERLE.
ADVERTISING VEHICLE.
APPLICATION FILED APR. 7, 1905.
7 SHEETS—SHEET 7.
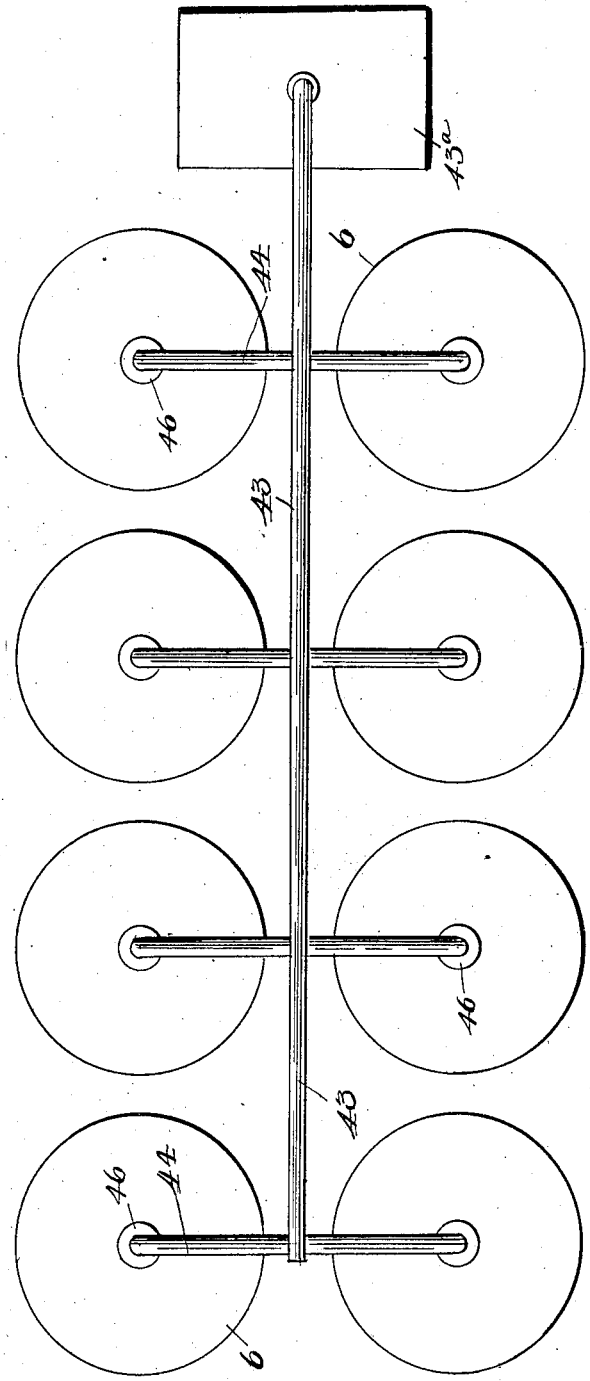
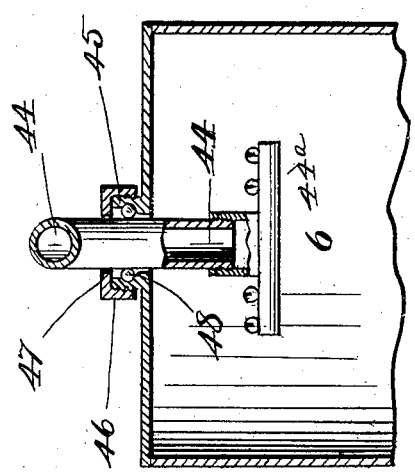
Witnesses
Jas. N. Blackwood
Jennie D. Gregory
Inventor
Frank X. Bimmerle
By James K. Polk,
Attorney

UNITED STATES PATENT OFFICE.

FRANK X. BIMMERLE, OF CINCINNATI, OHIO.

ADVERTISING-VEHICLE.

No. 882,446.     Specification of Letters Patent.     Patented March 17, 1908.

Application filed April 7, 1905. Serial No. 254,397.

*To all whom it may concern:*

Be it known that I, FRANK X. BIMMERLE, a citizen of the United States, residing at Cincinnati, in the county of Hamilton, State of Ohio, have invented certain new and useful Improvements in Advertising-Vehicles, of which the following is a specification.

My invention relates to an improv  t in advertising vehicles and has for its object to provide means whereby any and all classes of goods may be artistically and conveniently displayed to the best possible advantage and occupy a very limited amount of space.

It also has for its object to provide means for illuminating the same when desired.

It still further has for its object to provide an advertising vehicle which is simple, inexpensive, light and durable in construction, easy to operate, and which can be very readily transported.

My invention consists in the construction, combination and arrangement of the several parts as more fully hereinafter described and claimed.

Figure 6:
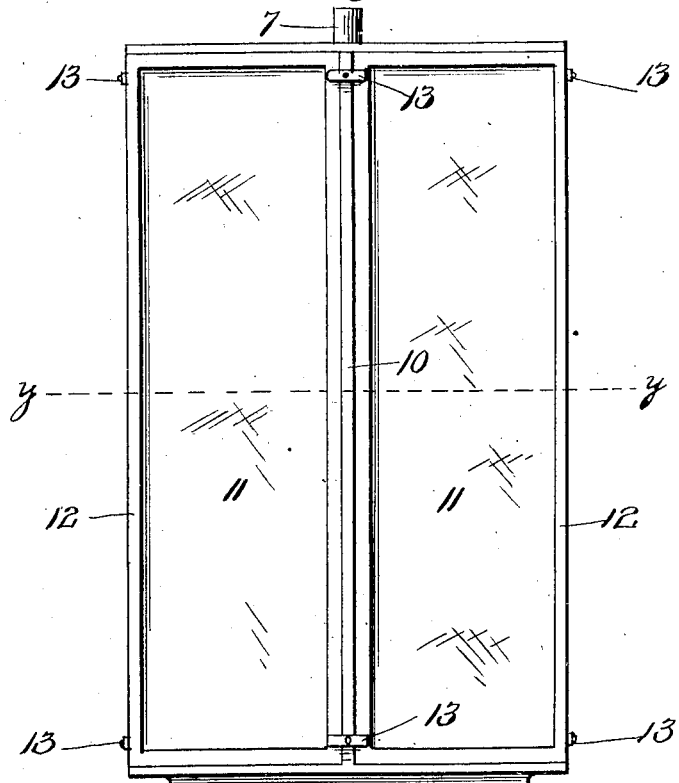
Figure 7:
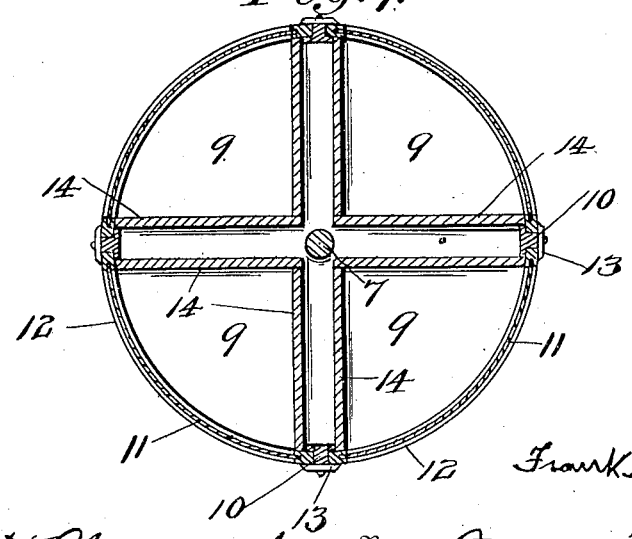

Referring to the drawings which illustrate my invention, Figure 1, is a side view in elevation having the rear wheel removed and the rear axle shown in section; Fig. 2, a horizontal section on the line *x x* of Fig. 1. Fig. 3, a front elevation of the two series of the upper and lower display-cylinders and their operating cables; Fig. 4, a top plan view of the driving mechanism and cables for operating the driving-shaft; Fig. 4ª, a cross section on line 1 1 of Fig. 4 looking in the direction of the arrow, the wheel at the end of the axle being omitted; Fig. 5, an enlarged detail front view of one of the levers for adjusting the cable to the desired position, up or down, on the windlass on the lower end of the driving shaft; Fig. 5ª, a central section on line 2 2 of Fig. 5. Fig. 6, a side elevation showing a modified form of the display cylinders; Fig. 7, a horizontal section on the line *y y* of Fig. 6. Figs. 8 and 9, detail sectional views of the hub of one of the rear wheels showing the pawl and ratchet device for governing the direction in which the rear axle and wheels rotate. Fig. 10, a side view in elevation of one of the tension devices for the cables which connect and drive the several cylinders. Fig. 11, a cross section on the line *z z* of Fig. 10. Fig. 12, a detail side view of one of the springs connecting the vehicle with the rear axle. Fig. 13, a top plan diagrammatic view of a system of pipes for supplying gas or other fluid to the several display cylinders when it is desired to illuminate the same. Fig. 14, a sectional view of the top of one of the cylinders showing, on an enlarged scale, the manner of connecting the system of pipes shown in Fig. 13, to the same. Fig. 15, a fragmental detail view of the rack for holding the operating lever 35 in adjusted position.

In the drawings in which like letters of reference denote like parts throughout the several views, 1 represents my advertising vehicle provided with front and rear wheels 2 & 3 respectively, an upper platform 4, lower platform 5.

The lower platform is provided with a double series of cylinders 6, each mounted on a shaft 7, and provided with a grooved pulley 8, at the lower end. The cylinders 6 may be made hollow, as shown in Fig. 1, or, if desired, may be made as shown in Figs. 6 and 7, in which the cylinders are divided into four compartments 9, triangular in shape, and between each compartment a T-shaped upright post 10, is provided.

11, are curved transparent fronts for said compartments, preferably made of glass, set in wooden frames 12, the side edges of said frames designed to engage the T-shaped upright posts 10, and 13, are turn buttons, pivoted on the said upright posts, and adapted to secure the fronts of the compartments in place. The sides 14, of said compartments are preferably made of wood or other opaque material.

A vertical drive shaft 15, is mounted at the center in the front of the vehicle and extends from the lower platform 5, to the top 16, of the vehicle said shaft being provided with a grooved pulley 17, just above the lower platform 5 and a windlass 18, just below said platform.

19, is a tension device which comprises a casing 20, having a slot 21, a slidable rod 22, mounted in said casing and provided with an upwardly projecting post 23, which carries a grooved pulley 24, and 25 is a spiral spring one end connected to the outer end of rod 22 and the other end to a hook 26.

27 is an endless cable or belt which passes around the pulley 17, engages both sides of the pulleys 8, and passes around the grooved pulley 24, attached to the tension device which by reason of the action of the spring 25, takes up any slack in said cable and keeps it taut.

28, are a number of idle rollers arranged between the cylinders for the purpose of retaining the cable in intimate contact with the grooved pulleys 8.

Instead of a double series of cylinders as shown on the lower platform, the upper platform is provided with a single series of cylinders and as they are similar in construction to the lower cylinders, and operatively connected together in the same manner the several parts are given the same numerals of reference. This single series is operated by means of the second cylinder from the front of the machine being mounted on the upper portion of the drive shaft 15.

The rear axle 29, which constitutes the driving axle, is provided with a drum 30, rigidly secured therein, and having its grooved surface covered with a rubber coating 30$^a$.

31, is an endless cable or chain which passes once around the windlass 18, and twice around the drum 30, the rubber covering on said drum producing friction and giving the cable a better purchase on the said windlass. The position of the cable 31, on the windlass, is changed or adjusted up or down, by means of a vertical link 32, having a forked lower end, each portion 33 of said fork being provided with a small grooved roller 34, said rollers engaging the under side of the cable.

35, indicates a lever provided with a fork at one end which embraces the driving shaft 15, and is connected to the top of the link 32, and the opposite end provided with an operating arm 33$^a$, and 36 is a toothed rack with which the lever 35, is adapted to engage and be held at different points thereon for the purpose of holding the link 32, at the desired elevation and the rope at the desired point on the windlass.

The rear wheels 3 are rotatably mounted on the axle 29 and have a boxing 39 on their inner sides in which are secured spring-actuated pawl 38 that engages the teeth or ratchet pinion 37 keyed to the shaft 29. The purpose of this construction is to admit of backing the vehicle and turning to change the direction of its travel without rotating the shaft in the reverse direction.

To the under side of the lower platform near the rear end springs 40, such as shown in Fig. 12, are attached and journal boxes 41, preferably with ball bearings, are attached to said springs and have spiral springs 42, between them and the lower platform. The rear axle 29, is mounted in said journal boxes.

In Figs. 13 and 14 I have shown means for illuminating the interior of cylinders which consists of a longitudinal main supply pipe 43, connected to any suitable illuminating fluid tank 43$^a$, and provided with laterally extending branch pipes 44, which connect with the tops of the several cylinders. In fitting the cylinders for the attachment of the pipes 43 and 44, the top of the cylinder is provided with an upwardly extending screw threaded collar 45, on which is secured an interiorly threaded cap 46, having a central hole 47. The ends of the branch pipes 44, are inserted through the holes 47, of the cap 46, and antifriction balls 48 are placed between the inner wall of the collar 45, and the outer walls of the pipes 44, so that when said cylinders rotate there will be very little friction at the top of said cylinders. Any suitable fixture or burner 44$^a$ can be affixed to the ends of the pipes 44, and if found desirable reflectors comprising mirrors or colored glass can be placed in proximity to said burners for the purpose of increasing the effectiveness of the illumination.

49, are spaces at the top of the vehicle over the display cylinders to contain cards bearing the names of the several exhibitors.

The operation is as follows:—The cable 31, is raised or lowered or adjusted to the desired point on the windlass by operating the lever 32, by means of the arm 35, and hand lever 33$^a$ and the vehicle is propelled by means of horses or by means of a gas, steam or other engine or any other suitable power and the rotation of the rear axle 29, which constitutes the driving axle and the cable 31, which connects the drum 30, with the windlass 18, communicates motion from said driving axle to the drive shaft 15, which in turn communicates motion to the upper and lower series of display cylinders by means of the cables 27.

What I claim as new and desire to protect by Letters Patent, is—

1. An advertising device provided with two series of rotatable cylinders, one of said series being arranged above the other series and each series connected by a cable, and means for simultaneously operating both of said series, substantially as shown and described.

2. An advertising device comprising a vehicle provided with upper and lower platforms, a series of display cylinders mounted on each platform, means for operatively connecting each series, and means for operating both of said series simultaneously, substantially as shown and described.

3. An advertising device comprising a wheeled vehicle provided with upper and lower platforms each provided with a series of rotatable cylinders, a pulley secured to each cylinder, a cable running over said pulleys and connecting each series, a drive shaft and means for operating said drive shaft, substantially as shown and described.

4. An advertising device comprising a vehicle, provided with upper and lower platforms, a series of display cylinders mounted on each platform, each series operatively connected together and a drive shaft for operating both of said series simultaneously, and means for operating said drive shaft from the axle of one of the wheels, substantially as shown and described.

5. An advertising device comprising a vehicle provided with upper and lower platforms, a single series of display cylinders mounted on the upper platform, a double series of display cylinders on the lower platform, means for operatively connecting the cylinders of the single series, means for operatively connecting the cylinders of the double series and means for simultaneously operating said single and double series, substantially as shown and described.

6. An advertising device comprising a wheeled vehicle provided with platforms arranged one above the other, each platform having a row of display cylinders provided with pulleys, a cable passing over the pulleys and connecting all the cylinders on each platform, a drive shaft, rollers mounted between each cylinder over which the cables run, a tension device for keeping said cables taut, and means for operating said drive shaft, substantially as shown and described.

7. An advertising device comprising a series of display cylinders, a drive shaft on which one cylinder of said series is mounted, a pulley and a windlass on said shaft, means for operatively connecting all of said cylinders, a second series of display cylinders operatively connected together by means of a cable which is connected with the pulley on the drive shaft, and means operatively connected with said windlass for rotating said drive shaft, substantially as shown and described.

8. An advertising device comprising a vehicle provided with rotatable bodies, a driving axle, a shaft, means for operatively connecting said rotatable bodies with said shaft, a windlass on said shaft, a cable connecting said driving axle with said windlass, and means for adjusting said cable on the windlass, substantially as shown and described.

9. An advertising device comprising a shaft having a windlass, a number of display bodies operatively connected together, and to said shaft, a driving shaft, a cable connecting said shaft with the driving shaft, a lever provided with rollers designed to engage said cable and adjust the same on said windlass, substantially as shown and described.

10. An advertising device comprising a shaft having a windlass, a number of display bodies operatively connected together and to said shaft, a driving shaft, a cable or belt connecting said shaft with the driving shaft, a forked link provided with rollers to engage said cable or belt and a lever connected to said link and provided with an operating arm, substantially as shown and described.

11. An advertising device comprising a rotatable body provided with an annular collar, a cap provided with an opening, and screwed on said collar, a pipe projecting through said opening, and a ball bearing between said collar and the pipe, substantially as shown and described.

12. An advertising device provided with means for introducing illuminating fluid therein comprising a rotatable body having a top provided with an upwardly projecting collar exteriorly screw threaded, an interiorly screw threaded cap provided with a hole, a pipe provided with an elbow having a short pipe extending through said hole, and a ball bearing between said collar and the short piece of pipe, substantially as shown and described.

13. An advertising device provided with rotatable hollow cylinders each having a top with an upwardly projecting collar, a cap for said collar provided with a hole, and means for introducing illuminating fluid into said cylinders comprising a main supply pipe with pipes connecting said main supply pipe with the several cylinders, substantially as shown and described.

14. An advertising device provided with rotatable hollow cylinders each having a top provided with an upwardly extending screw threaded collar, a screw threaded cap for said collar, and provided with a central hole, and means for introducing illuminating fluid to a burner in said cylinders comprising a main supply pipe, pipes extending laterally from said main supply pipe and extending into the several cylinders, and a ball bearing between the collar of said cylinder and the laterally extending pipes, substantially as shown and described.

15. In an advertising wagon having rotatable bodies mounted on the platform thereof, the rear axle of the wagon operatively connected with said rotatable bodies, and means to automatically stop the rotation of said bodies when the wagon is backed, substantially as shown and described.

16. In an advertising wagon having a platform and an axle journaled thereon, rotatable bodies on said platform, operative connections between said axle and the rotatable bodies, ratchet pinions secured to said axle adjacent to the ends thereof, wheels journaled on said axles, and spring pawls secured to said wheels and engaging the teeth of said ratchet pinions, substantially as shown and described.

In witness whereof, I have hereunto set my hand in presence of two subscribing witnesses.

FRANK X. BIMMERLE.

Witnesses:
D. R. KEMPER,
WILLIS M. KEMPER.